(12) United States Patent
Ishida

(10) Patent No.: US 11,042,114 B2
(45) Date of Patent: Jun. 22, 2021

(54) IMAGE FORMING SYSTEM, SHELF FOR IMAGE FORMING APPARATUS, AND IMAGE FORMING APPARATUS

(71) Applicant: Masahiro Ishida, Kanagawa (JP)

(72) Inventor: Masahiro Ishida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/418,372

(22) Filed: May 21, 2019

(65) Prior Publication Data

US 2019/0361387 A1 Nov. 28, 2019

(30) Foreign Application Priority Data

May 28, 2018 (JP) .............................. JP2018-101158
Dec. 4, 2018 (JP) .............................. JP2018-227645

(51) Int. Cl.
  *G03G 21/16* (2006.01)
  *G03G 15/00* (2006.01)
  *B41J 29/02* (2006.01)
  *H04N 1/00* (2006.01)

(52) U.S. Cl.
  CPC ..... *G03G 21/1619* (2013.01); *G03G 15/5016* (2013.01); *G03G 21/1614* (2013.01); *G03G 21/1647* (2013.01); *B41J 29/026* (2013.01); *G03G 2221/1678* (2013.01); *G03G 2221/1681* (2013.01); *H04N 1/00538* (2013.01)

(58) Field of Classification Search
  CPC ........... G03G 21/1619; G03G 21/1614; G03G 2221/1681; G03G 21/1647; G03G 21/1642; G03G 2221/1678; G03G 2221/1651; G03G 15/5016; B41J 29/06; B41J 29/026; H04N 1/00525; H04N 1/00538; H04N 1/00541; H04N 1/00557; H04N 1/00559; H04N 1/00631
  See application file for complete search history.

(56) References Cited

U.S. PATENT DOCUMENTS

| | | | |
|---|---|---|---|
| 7,050,204 B1* | 5/2006 | Sato | H04N 1/00525 358/471 |
| 7,418,219 B2* | 8/2008 | Woo | G03G 15/605 399/107 |
| 2002/0043910 A1* | 4/2002 | Hashimoto | G03G 15/00 312/282 |
| 2006/0170831 A1* | 8/2006 | Muraki | B41J 29/13 349/1 |

(Continued)

FOREIGN PATENT DOCUMENTS

| | | |
|---|---|---|
| JP | 4-195313 | 7/1992 |
| JP | 7-024044 | 1/1995 |

(Continued)

*Primary Examiner* — Walter L Lindsay, Jr.
*Assistant Examiner* — Laura Roth
(74) *Attorney, Agent, or Firm* — Harness, Dickey & Pierce, P.L.C.

(57) ABSTRACT

An image forming system includes a shelf portion, a post, and an image forming apparatus. An article is placeable on the shelf portion. The post is configured to support the shelf portion. The image forming apparatus is configured to form an image and includes a support portion on an upper surface of the image forming apparatus. The support portion is configured to support the post.

8 Claims, 14 Drawing Sheets

(56) References Cited

U.S. PATENT DOCUMENTS

| | | | | |
|---|---|---|---|---|
| 2012/0162728 A1* | 6/2012 | Ota | ................... | G03G 21/1619 |
| | | | | 358/498 |
| 2015/0281521 A1* | 10/2015 | Takeuchi | ........... | H04N 1/00517 |
| | | | | 399/81 |
| 2019/0361381 A1* | 11/2019 | Ishida | ................ | G03G 15/5016 |
| 2019/0361385 A1* | 11/2019 | Ishida | ................ | G03G 21/1614 |
| 2020/0073320 A1* | 3/2020 | Ishida | ................ | G03G 15/5091 |

FOREIGN PATENT DOCUMENTS

| | | | |
|---|---|---|---|
| JP | 2000-233547 | | 8/2000 |
| JP | 2001-134030 | | 5/2001 |
| JP | 2001-236000 | | 8/2001 |
| JP | 2003-107827 | | 4/2003 |
| JP | 2003-110250 | | 4/2003 |
| JP | 2003101705 A | * | 4/2003 |
| JP | 2007-036898 | | 2/2007 |
| JP | 2007-150474 | | 6/2007 |
| JP | 2009-193487 | | 8/2009 |
| JP | 2018-005198 | | 1/2018 |

\* cited by examiner

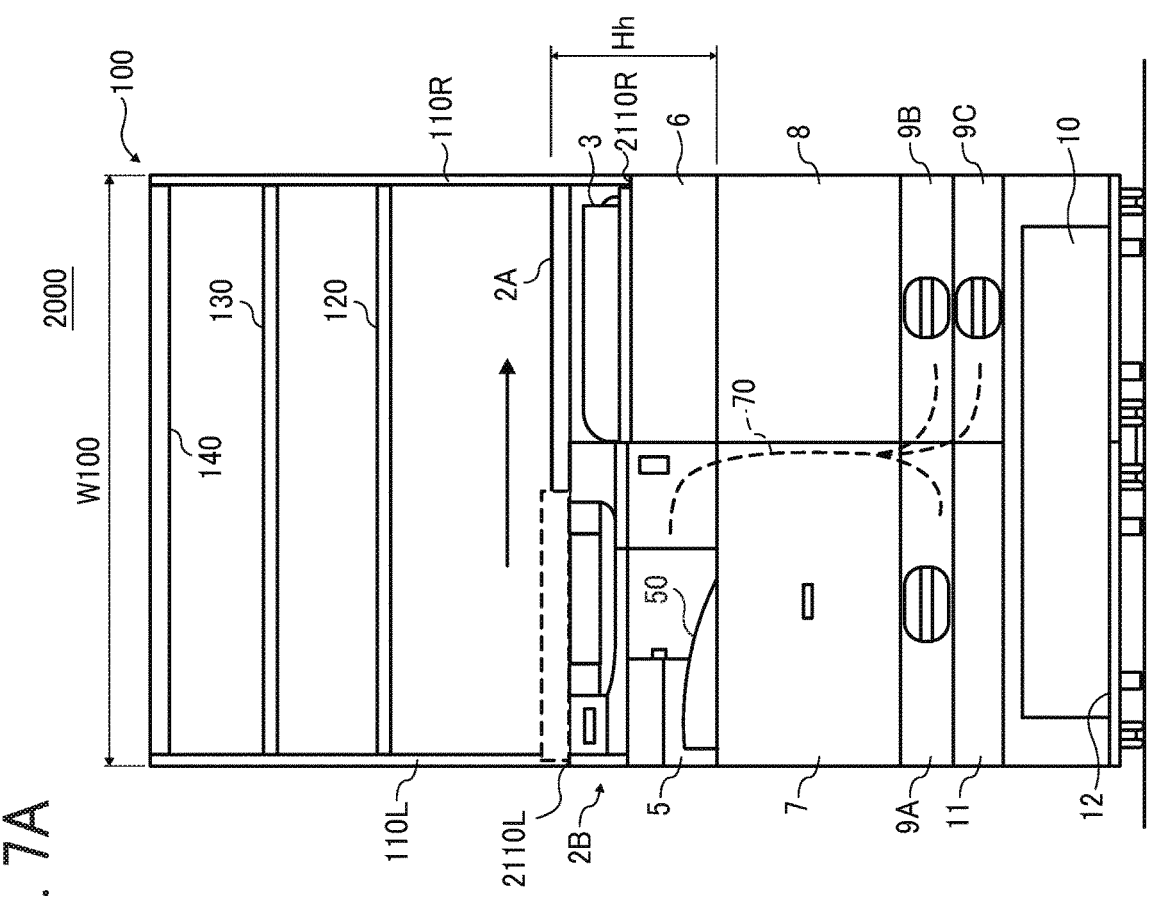

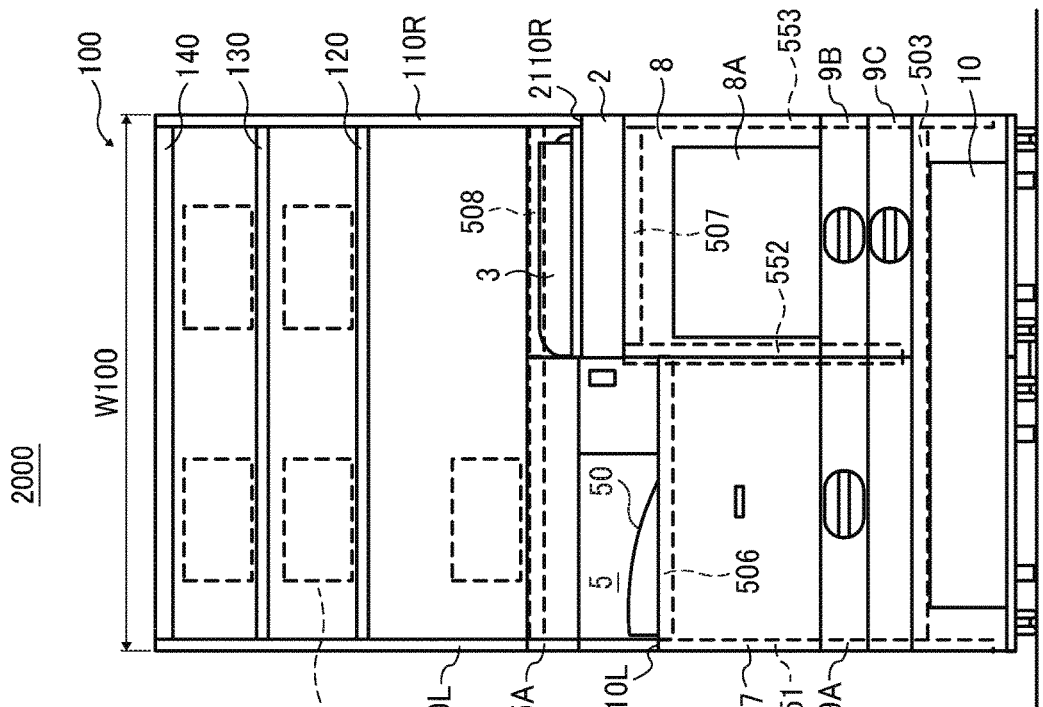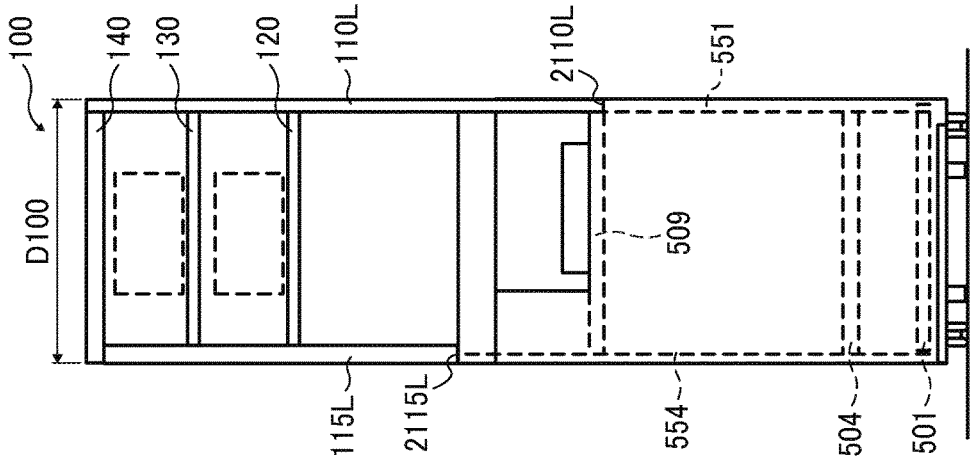

IMAGE FORMING SYSTEM, SHELF FOR IMAGE FORMING APPARATUS, AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2018-101158, filed on May 28, 2018, and 2018-227645, filed on Dec. 4, 2018, in the Japan Patent Office, the entire disclosure of each of which is hereby incorporated by reference herein.

BACKGROUND

Technical Field

Aspects of the present disclosure relate to an image forming system, a shelf for an image forming apparatus, and an image forming apparatus.

Related Art

A rack for an image forming apparatus is known that includes a shelf portion on which a peripheral device of the image forming apparatus can be placed.

SUMMARY

In an aspect of the present disclosure, there is provided an image forming system that includes a shelf portion, a post, and an image forming apparatus. An article is placeable on the shelf portion. The post is configured to support the shelf portion. The image forming apparatus is configured to form an image and includes a support portion on an upper surface of the image forming apparatus. The support portion is configured to support the post.

In another aspect of the present disclosure, there is provided a shelf for an image forming apparatus that forms an image. The shelf includes a shelf portion and a post. An article is placeable on the shelf portion. The post is configured to support the shelf portion and supported by an upper surface of the image forming apparatus.

In still another aspect of the present disclosure, there is provided an image forming apparatus that includes a support portion on an upper surface of the image forming apparatus. The support portion is configured to support a post of a shelf. The image forming apparatus is configured to support the shelf that includes a shelf portion on which an article is placeable and the post configured to support the shelf portion.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 7A and 7B are schematic views of a second variation of the image forming system illustrated in FIG. 5;

FIGS. 8A, 8B, and 8C are schematic views of a third variation of the image forming system illustrated in FIG. 5;

Figure 1:
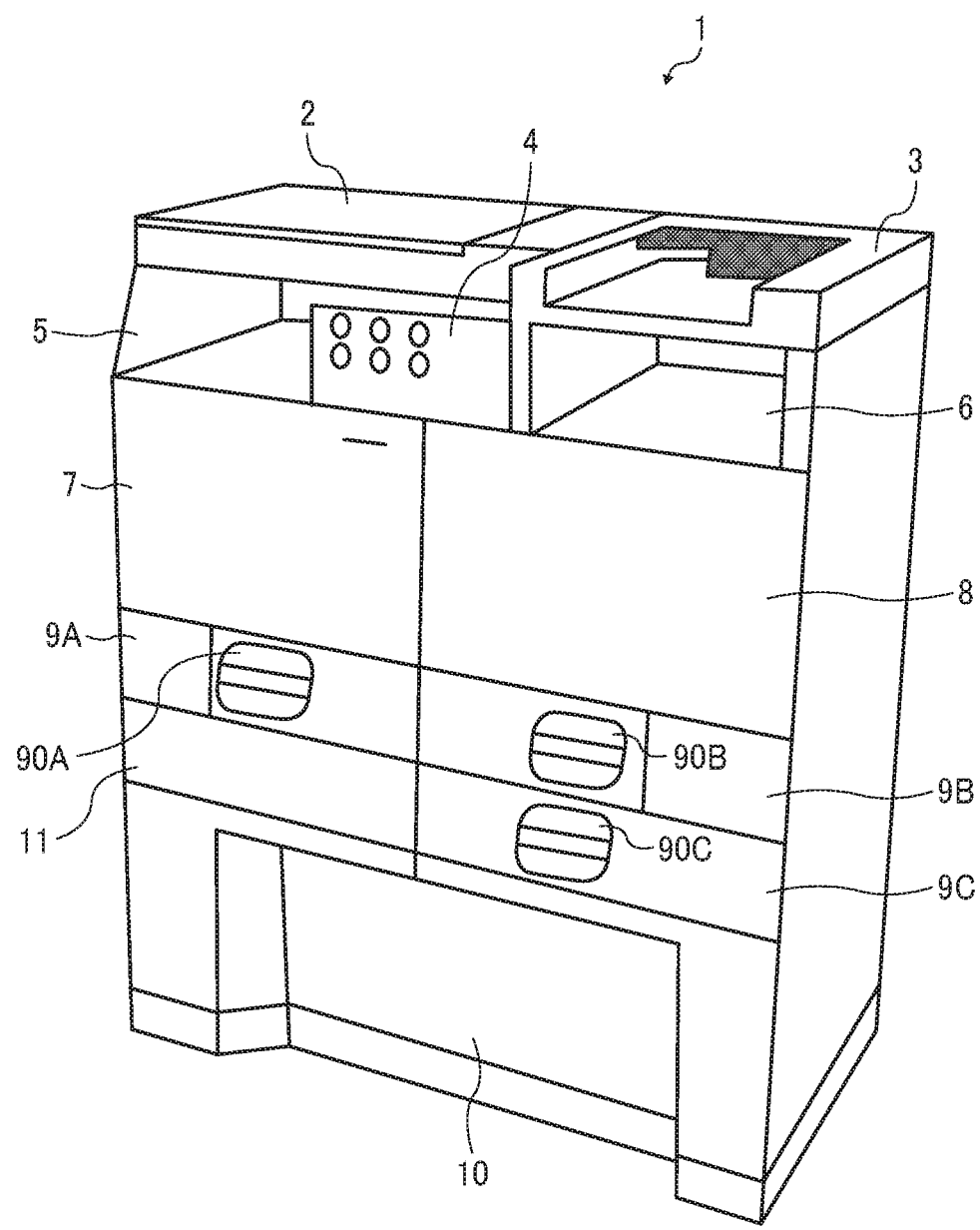
FIG. 1 is a perspective view of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a detailed description is given of embodiments of this disclosure with reference to the drawings.

FIG. 1 is a perspective view of an image forming apparatus 1 according to an embodiment of the present disclosure. The image forming apparatus 1 includes a scanner 2 that reads an image of a document, an automatic document feeder 3 that reads an image on a document while conveying the document, an operation unit 4 that receives an operation input to the image forming apparatus 1, an ejection unit 5 to eject and store the sheet on which an image is formed, a loading unit 6 to load a document or a sheet, an image forming device 7 to form an image on a sheet, a jam processing unit 8 to process a sheet jammed at the image forming device 7, sheet trays 9A, 9B, and 9C to stack sheets to be conveyed to the image forming device 7, an opening 10 formed at a lower portion of the image forming apparatus 1, and an electrical component housing 11 to house electrical components, such as an electrical board with, e.g., a power supply and a controller to control image forming operation of the image forming apparatus 1. The sheet trays 9A, 9B, and 9C include handles 90A, 90B, and 90C, respectively, to pull out the sheet trays 9A, 9B, and 9C from the image forming apparatus 1.

Figure 2A:
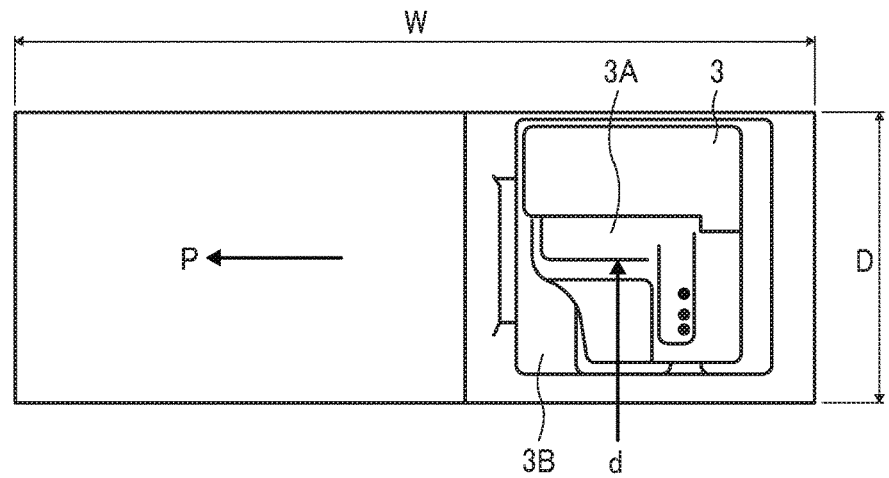
FIG. 2A is a top view of the image forming apparatus illustrated in FIG. 1.
Figure 2B:
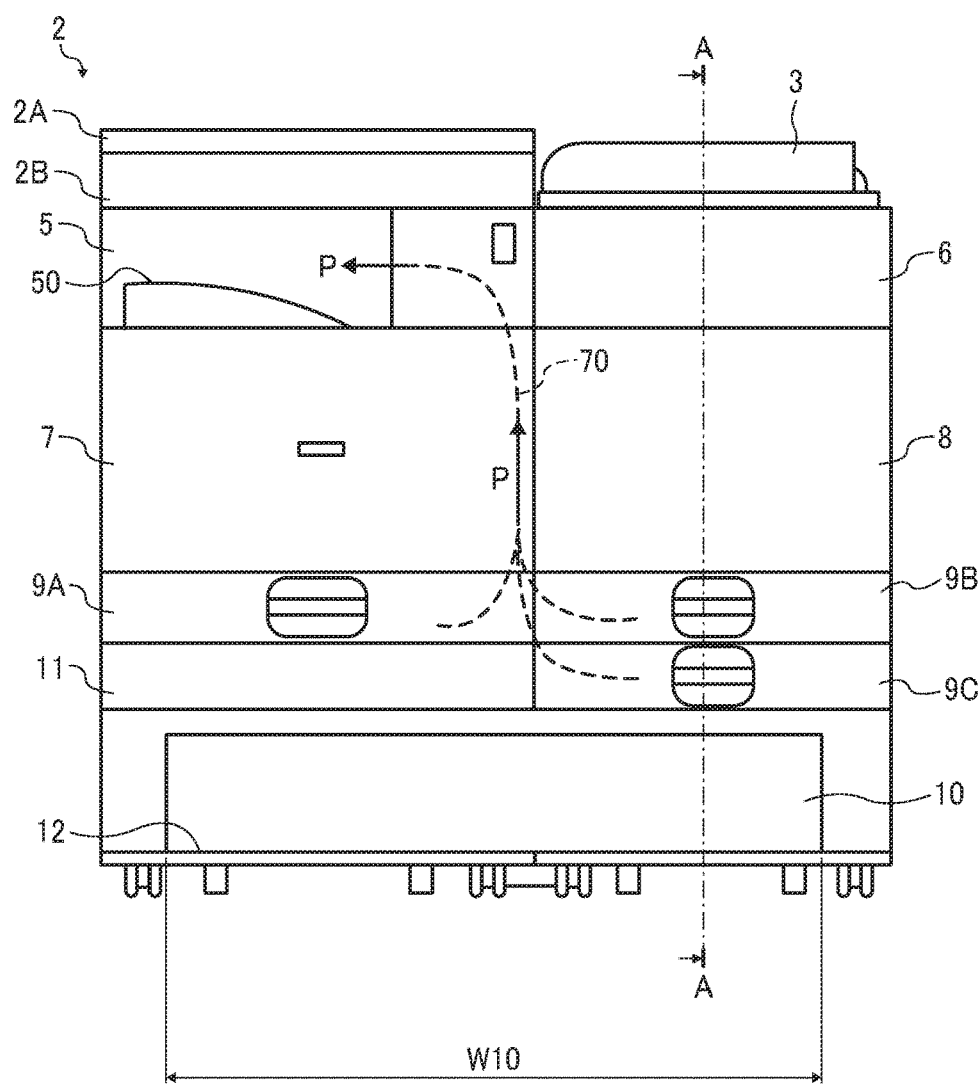
FIG. 2B is a front view of the image forming apparatus illustrated in FIG. 1.

FIG. 2A is a top view of the image forming apparatus 1 illustrated in FIG. 1. FIG. 2B is a front view of the image forming apparatus 1 illustrated in FIG. 1.

In FIG. 2A, W represents a size in a width direction of the image forming apparatus 1 and is, for example, a distance between both side surfaces of an exterior housing. D indicates the size of the image forming apparatus 1 in the depth direction. P indicates a direction in which a sheet on which an image is formed is ejected. Arrow d indicates a direction in which a document is conveyed by the automatic document feeder 3. The automatic document feeder 3 includes a document stacker 3A on which documents are stacked and a document output portion 3B onto which the conveyed document is ejected. W is preferably 600 mm or more and 900 mm or less, this allowing the width of the image forming apparatus 1 to match a range of 600 mm or more for a space of the wheelchair user's foot and 900 mm or less for office furniture. In addition, D is preferably 450 mm or less, thus allowing the depth to be the same as other office furniture to secure a passage for wheelchair users.

In FIG. 2B, in the automatic document feeder 3, W10 indicates the size of the opening 10 in the width direction, and P indicates a direction in which a sheet is fed and ejected. The image forming apparatus 1 includes a bottom plate 12 at the bottom and internally includes a conveyance unit 70 that conveys sheets stacked on the sheet trays 9A, 9B, and 9C to the image forming device 7 and the ejection unit 5. The direction d in which the document is conveyed is orthogonal to the direction Yin which the sheet is conveyed and ejected. Such a configuration can suppress an increase in the width of the image forming apparatus 1 even in a case in which a long document is output with a long sheet.

The scanner 2 includes a pressure plate 2A to open and close and a scanner body 2B to read an image of a document mounted on the scanner body 2B. The ejection unit 5 includes a sheet stacker 50 to stack sheets on which images have been formed. The bottom plate 12 is configured as the bottom of the opening 10.

Figure 3:
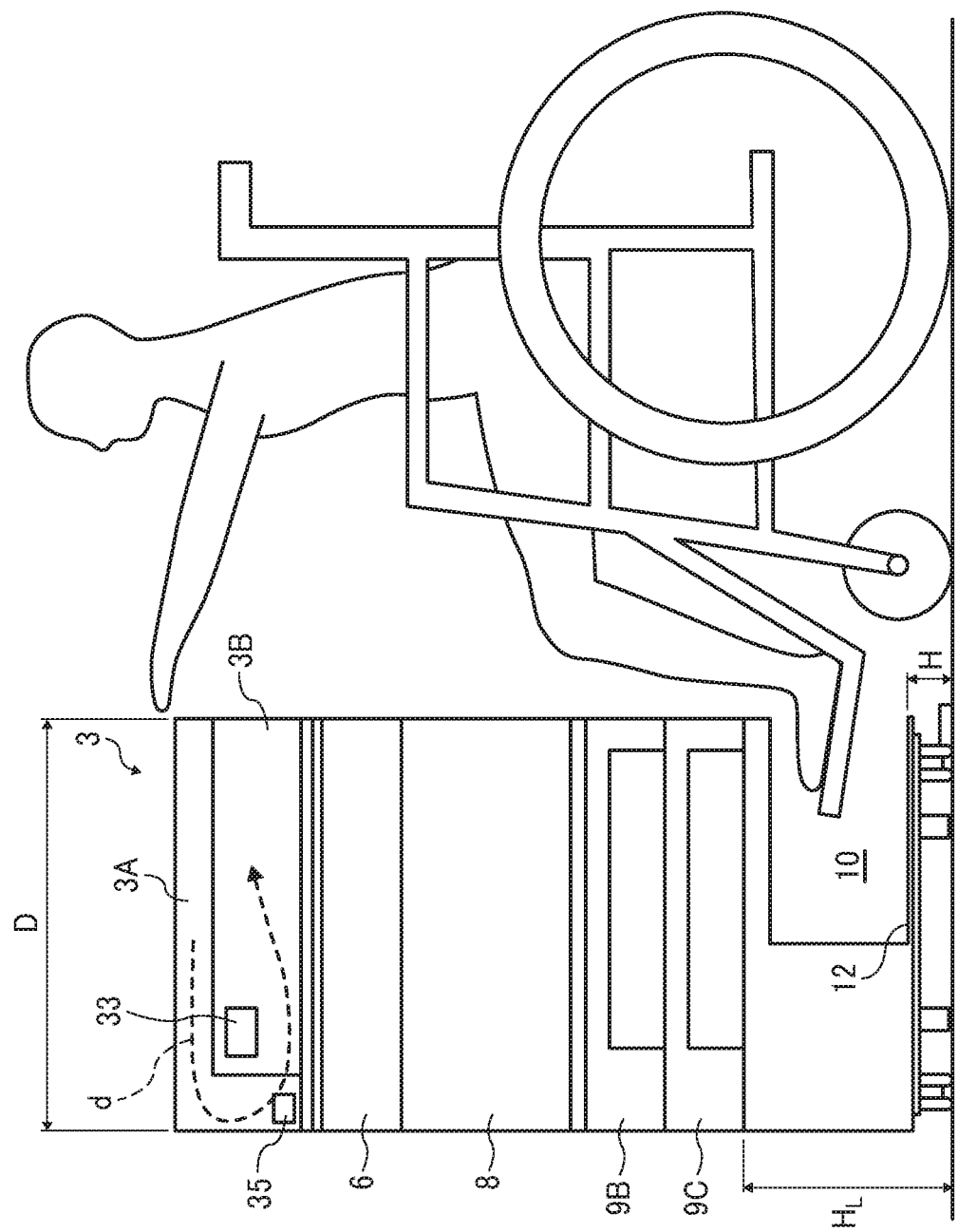
FIG. 3 is a cross-sectional view of the image forming apparatus illustrated in FIGS. 2A and 2B.

FIG. 3 is a cross-sectional view of the image forming apparatus 1 illustrated in FIG. 2, taken along line A-A and is an illustration of a use condition of a wheelchair user. H is the height of the bottom plate 12 from the floor. The automatic document feeder 3 includes a back side reading unit 33 that reads an image on a back side of the document to be conveyed and a front side reading unit 35 that reads an image on a front side of the document to be conveyed. That is, the automatic document feeder 3 can read both sides of the document in one feeding operation, which shortens the feeding path, and can reduce the occurrence rate of the document jam and improve the operability.

Figure 4:
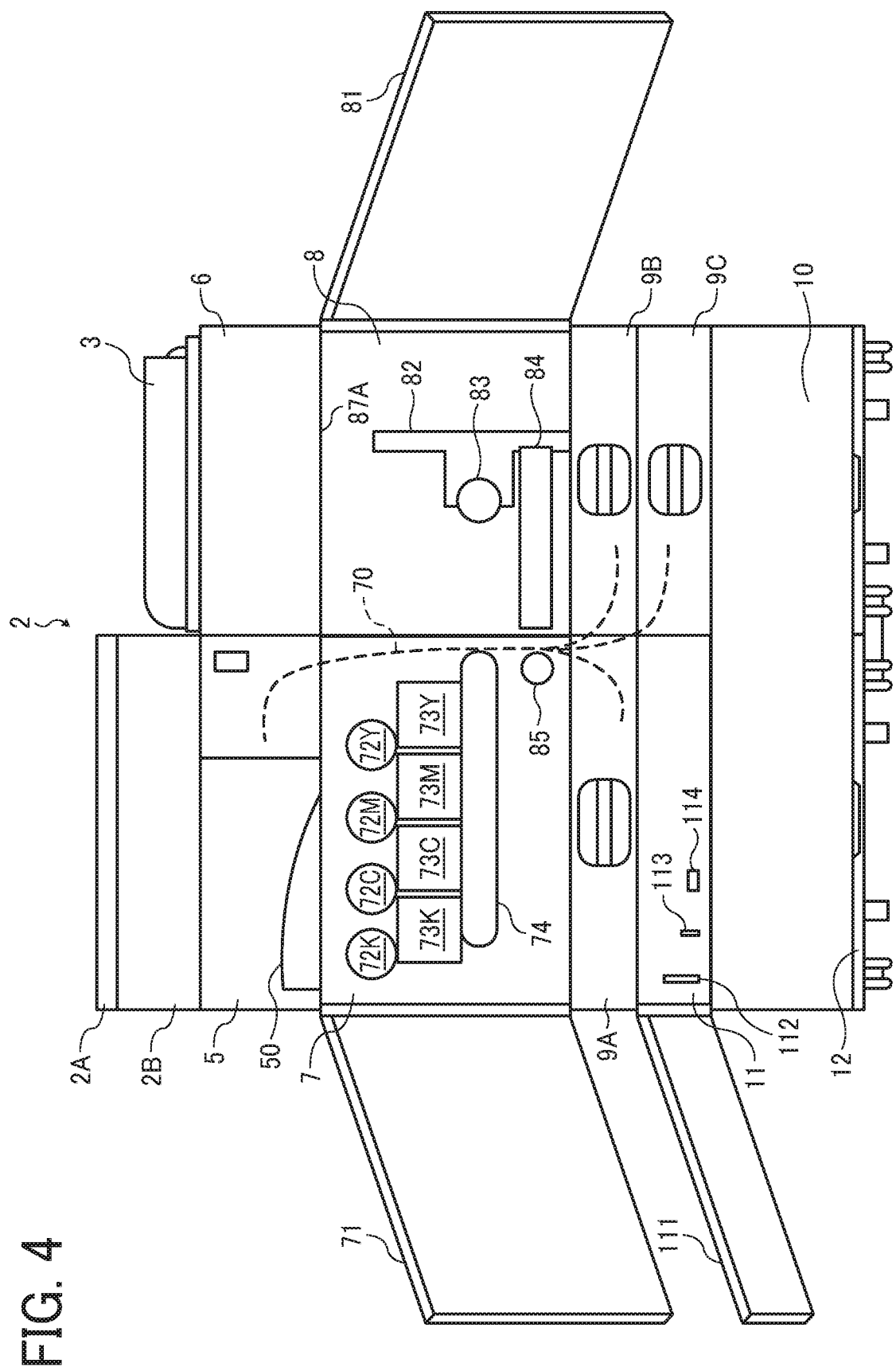
FIG. 4 is a front view of an internal configuration of the image forming apparatus illustrated in FIGS. 2A and 2B.

FIG. 4 is a front view of an internal configuration of the image forming apparatus 1 illustrated in FIG. 2. The image forming apparatus 1 includes an openable member 71 to open an inside of the image forming device 7, an openable member 81 to open an inside of the jam processing unit 8, and an openably closable member 111 to open an inside of the electrical component housing 11.

The image forming device 7 includes toner bottles 72K, 72C, 72M, and 72Y that store toners of respective colors of black, cyan, magenta, and yellow, and image forming units 73K, 73C, 73M, and 73Y to form images of respective colors of black, cyan, magenta, and yellow using toners supplied from the toner bottles 72K, 72C, 72M, and 72Y.

The image forming device 7 further includes an intermediate transfer unit 74, a secondary transfer unit 83, and registration roller pair 85. The intermediate transfer unit 74 transfers images of respective colors formed by the image forming units 73K, 73C, 73M, and 73Y. The secondary transfer unit 83 secondarily transfers the toner images transferred from the intermediate transfer unit 74 onto the sheet conveyed through the conveyance unit 70. The registration roller pair 85 conveys the sheet to the secondary transfer unit 83.

The jam processing unit 8 internally includes a jam processing cover 82 that opens the conveyance unit 70 with respect to the internal space of the jam processing unit 8 and a slide rail 84 that slides the jam processing cover 82.

The secondary transfer unit 83 is attached to the jam processing cover 82. With a movement of the jam processing cover 82, the secondary transfer roller 75 is movable between a secondary transfer position to secondarily transfer the image onto the sheet and an opening position to open the conveyance unit 70.

The electrical component housing 11 internally includes a card insertion slot 112 into which a secured digital (SD) card is inserted, a universal serial bus (USB) connection unit 113 to which a USB terminal is connected, and a cable connection unit 114 to which a local area network (LAN) cable is connected.

Figure 5:
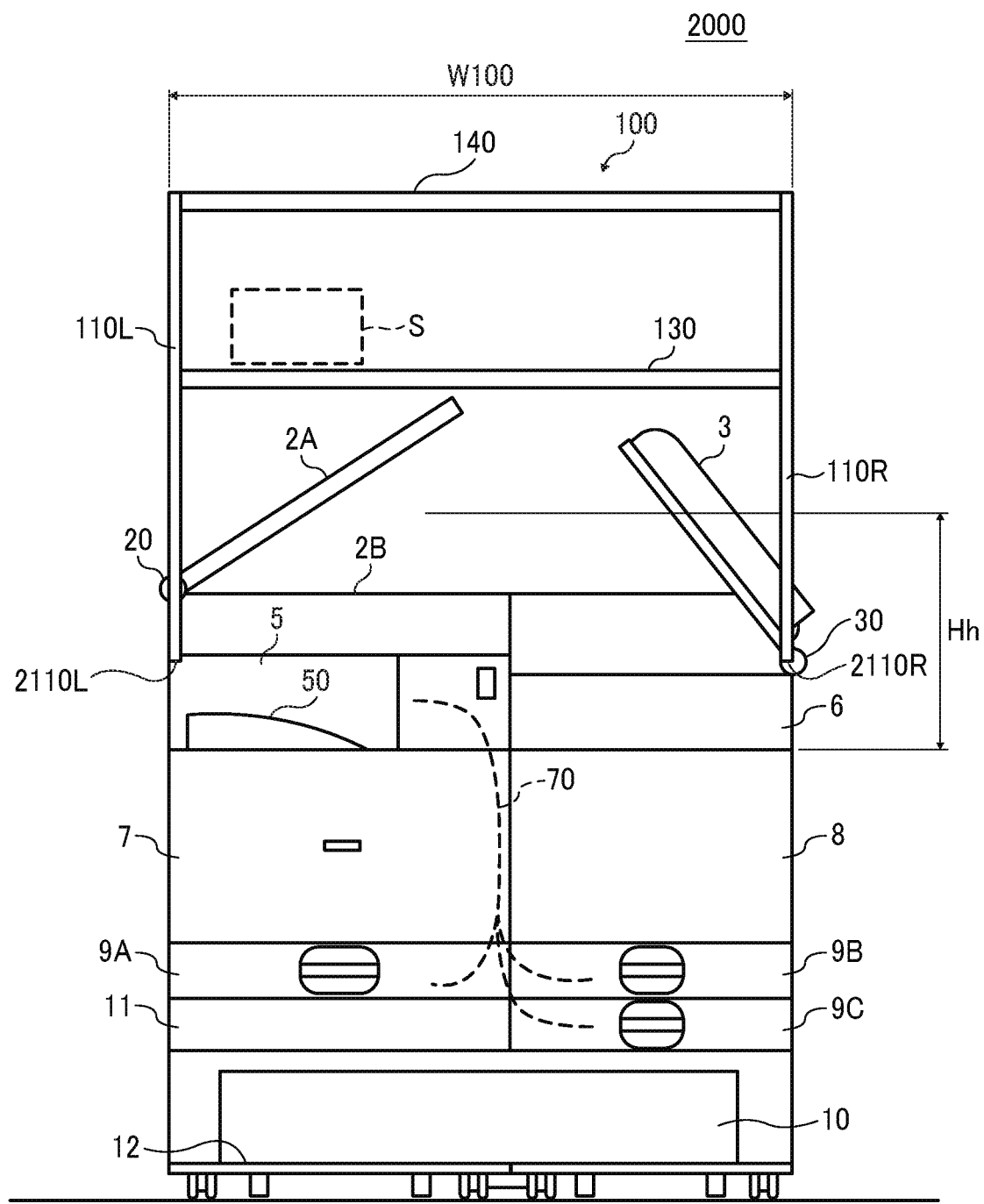
FIG. 5 is a front view of an image forming system according to an embodiment of the present disclosure.

FIG. 5 is a front view of an image forming system 2000 according to an embodiment of the present disclosure. The image forming system 2000 includes a shelf 100 in which an article S is placeable, together with the image forming apparatus 1 illustrated in FIG. 2B.

The scanner 2 of the image forming apparatus 1 includes a pressure plate support shaft 20 that rotatably supports the pressure plate 2A. The image forming apparatus 1 includes a support shaft 30 that rotatably supports the automatic document feeder 3. Hh is the height of the operation position for opening and closing the pressure plate 2A and the automatic document feeder 3 with respect to the lower end of the ejection unit 5.

The pressure plate 2A is openable and closable with respect to the scanner body 2B with the pressure plate support shaft 20 as a fulcrum. That is, the pressure plate 2A is movable between a closed position to cover and close an upper portion of the scanner body 2B and an open position to open the upper portion of the scanner body 2B. FIG. 5 illustrates a state in which the pressure plate 2A is in the closed position. The document is placed on the scanner body 2B with the pressure plate 2A moved to the open position. Then, the pressure plate 2A is moved to the closed position so that the scanner body 2B can read the document. The pressure plate 2A applies pressure to the document at the closed position, thus preventing the document from being displaced. The pressure plate 2A also acts as a background plate in reading the document at the closed position, thus allowing good reading. In FIG. 5, the pressure plate support shaft 20 is disposed at the left end of the image forming apparatus 1 in the width direction. An axial direction of the pressure plate support shaft 20 is arranged in parallel with the depth direction of the image forming apparatus 1. Such a configuration can restrict the operation range in the depth direction when a user handles the pressure plate 2A.

The automatic document feeder 3 is openable and closable with respect to the document placement portion of the image forming apparatus 1 with the support shaft 30 as a fulcrum. That is, the automatic document feeder 3 is movable between a closed position to cover and close an upper part of the loading unit 6 and an open position to open the upper part of the loading unit 6. FIG. 5 illustrates a state in which the automatic document feeder 3 is in the closed position. Thus, the user places or takes out the document or the sheets on the loading unit 6 in a state in which the automatic document feeder 3 is moved to the open position. Further, the user uses the automatic document feeder 3 in a state in which the automatic document feeder 3 is moved to the closed position. In FIG. 5, the support shaft 30 is disposed at the right end of the image forming apparatus 1 in the width direction. An axial direction of the support shaft 30 is arranged in parallel with the depth direction of the image forming apparatus 1. Such a configuration can restrict the operation range in the depth direction when a user handles the automatic document feeder 3.

The shelf 100 includes a shelf portion 130 on which the article S is placeable, a top plate 140 located at the top of the shelf 100, and a right post 110R and a left post 110L to support the shelf portion 130 and the top plate 140. The right post 110R and the left post 110L are supported by a support portion 2110L and a support portion 2110R, respectively, disposed on an upper portion and the upper surface of the image forming apparatus 1. Such arrangement of the support portion 2110L and the support portion 2110R in the upper portion of the image forming apparatus 1 allows a smaller occupation area of the image forming apparatus 1 on the installation surface (floor) than the case in which the support portions are disposed on the installation surface (floor) of the image forming apparatus 1. Furthermore, the arrangement of the support portion 2110L and the support portion 2110R on the upper surface of the image forming apparatus 1 allows the occupation area of the shelf 100 to be included within the occupation area of the upper surface of the image forming apparatus 1.

W100 represents the size of the shelf 100 in the width direction, and as an example, is the distance between the left end of the left post 110L and the right end of the right post 110R. W100 has a relationship of W100≤W with respect to W representing the size of the image forming apparatus 1 in the width direction. Such a configuration reduces the occupation area in the width direction in which the entire image forming system 2000 is installed. The shelf portion 130 is disposed at a height at which the shelf portion 130 does not interfere with the pressure plate 2A of the scanner 2 and the automatic document feeder 3 with the pressure plate 2A and the automatic document feeder 3 open. In the present embodiment, the support shaft 30 of the automatic document feeder 3 is disposed outside the image forming apparatus 1 in the width direction of the image forming apparatus 1. In some embodiments, the support shaft 30 may be disposed inside the image forming apparatus 1 in the width direction. In such a case, even when the automatic document feeder 3 is in the open position, the automatic document feeder 3 does not protrude to the outside of the right post 110R as illustrated in FIG. 5. Such a configuration allows another device to be disposed on the side (right side in FIG. 5) of the image forming apparatus 1 without a gap from the right post 110R, thus achieving space saving.

Figure 6:
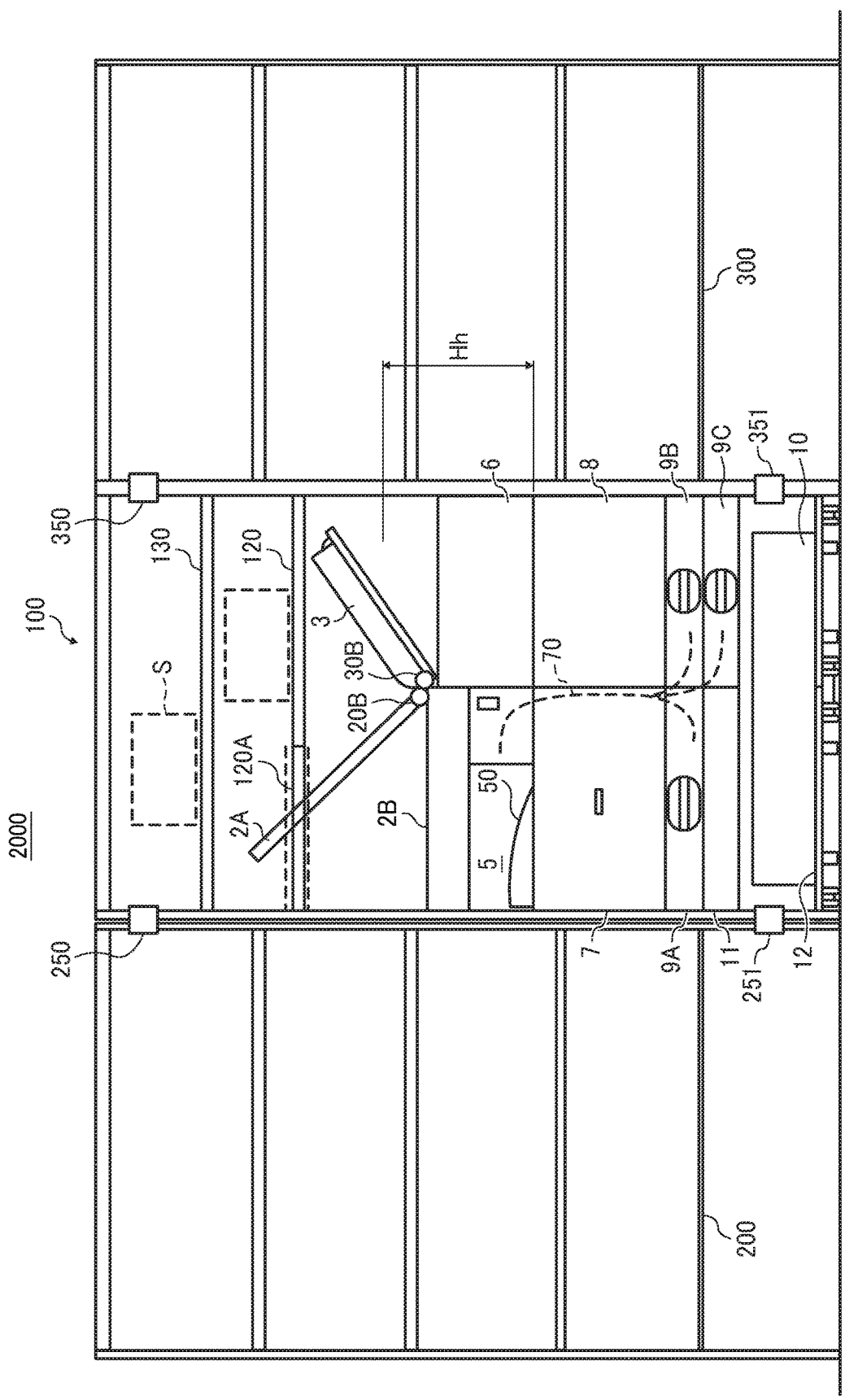
FIG. 6 is a front view of a variation of the image forming system illustrated in FIG. 5.

FIG. 6 is a variation of the embodiment illustrated in FIG. 5. The image forming system 2000 further includes a second shelf 200 and a third shelf 300 in which articles are placeable, an upper connecting portion 250 and a lower connecting portion 251 to connect the shelf 100 and the second shelf 200, and an upper connecting portion 350 and a lower connecting portion 351 to connect the shelf 100 and the third shelf 300. Such a configuration can prevent the fall of the shelf 100.

The scanner 2 of the image forming apparatus 1 includes a pressure plate support shaft 20B rotatably supporting the pressure plate 2A. The image forming apparatus 1 includes a support shaft 30B rotatably supporting the automatic document feeder 3.

The pressure plate support shaft 20B is disposed at a central portion in the width direction of the image forming apparatus 1 so as to extend in parallel with the depth direction of the image forming apparatus 1. The pressure plate 2A is openable and closable with respect to a scanner body 2B with the pressure plate support shaft 20B as a fulcrum. Such a configuration can restrict the operation range in the depth direction when a user handles the pressure plate 2A.

The support shaft 30B is disposed at a central portion in the width direction of the image forming apparatus 1 so as to extend in parallel with the depth direction of the image forming apparatus 1. The automatic document feeder 3 is openable and closable with respect to the image forming apparatus 1 with the support shaft 30B as a fulcrum. Such a configuration can restrict the operation range in the depth direction when a user handles the automatic document feeder 3.

The shelf 100 includes a second shelf portion 120, on which an article S is placeable, below the shelf portion 130. The second shelf portion 120 is supported by the right post 110R and the left post 110L. The second shelf portion 120 is disposed at a height at which the second shelf portion 120 does not interfere with the automatic document feeder 3 with the automatic document feeder 3 open. The second shelf portion 120 has an opening 120A that vertically opens. The opening 120A is disposed so that the pressure plate 2A of the scanner 2 does not pass through and interfere with the second shelf portion 120 with the pressure plate 2A being open.

FIGS. 7A and 7B are schematic views of a second variation of the embodiment illustrated in FIG. 5. The scanner 2 of the image forming apparatus 1 holds the pressure plate 2A slidably with respect to the scanner body 2B. That is, the pressure plate 2A is movable between a closed position to cover and close an upper portion of the scanner body 2B and an open position to open the upper portion of the scanner body 2B. In FIG. 7, the pressure plate 2A is in the open position. The user places a document on the scanner body 2B with the pressure plate 2A moved to the open position, moves the pressure plate 2A to the closed position, and causes the scanner body 2B to read the document. The pressure plate 2A can prevent the document from being displaced by applying pressure to the document at the closed position, and can perform good reading by acting as a background plate at the closed position at the time of document reading. The automatic document feeder 3 is disposed such that the upper end of the automatic document feeder 3 is positioned lower than the lower end of the pressure plate 2A. The pressure plate 2A is movable by horizontally sliding from above the scanner body 2B to above the automatic document feeder 3. Hh is the height from the lower end (the sheet discharge surface on which the discharged sheets are stacked) of the ejection unit 5 to the upper surface of the pressure plate 2A. Thus, the operation height can be restricted.

The shelf 100 includes the second shelf portion 120 as in the embodiment illustrated in FIG. 6 and further includes the right rear post 115R supporting the shelf portion 130, the second shelf portion 120, and the top plate 140. The second shelf portion 120 is disposed at a height at which the second shelf portion 120 does not interfere with the automatic document feeder 3 with the automatic document feeder 3 being open. The pressure plate 2A slides in the horizontal direction and thus does not interfere with the second shelf portion 120.

D100 represents the size of the shelf 100 in the depth direction of the shelf 100 and has a relationship of D100≤D with respect to D representing the size of the image forming apparatus 1 in the depth direction. Such a configuration can reduce the occupation area in the depth direction in which the entire image forming system 2000 is installed. The shelf 100 is configured such that an edge 100F of the shelf 100 is disposed at the same position as or behind an edge 1F of the image forming apparatus 1 in the front direction of the image forming apparatus 1. The front surface is a surface of the image forming apparatus 1 that the user faces when the user operates the image forming apparatus 1, and more specifically, a surface on which, e.g., the operation unit 4 and the handle 90A illustrated in FIG. 1 and the openable member 71 illustrated in FIG. 4 are disposed.

The right rear post 115R is supported on the upper portion and the upper surface of the image forming apparatus 1 and is shorter in the height direction than the right front post 110R. The upper ends of the right front post 110R and the right rear post 115R are both fixed to the top plate 140. The lower end of the right rear post 115R is supported above the lower end of the right front post 110R on the upper portion and the upper surface of the image forming apparatus 1. That is, the support portion 2115R supporting the right rear post 115R is disposed higher than the support portion 2110R supporting the right front post 110R.

The scanner 9 and the automatic document feeder 3 are disposed in the upper portion (upper surface) of the image forming apparatus 1. It is difficult to set the support portion of the right front post 110R with the support portion of the right rear post 115R at the same height. However, by making the lengths of the right front post 110R and the right rear post 115R different from each other, the right front post 110R and the right rear post 115R can be easily attached to the upper portion and the upper surface of the image forming apparatus 1. Similarly, the left front post 110L is shorter than the right front post 110R in the height direction. The support portion 2110L of the left front post 110L is disposed higher than the support portion 2110R that supports the right front post 110R. With such a configuration, the occupation area on the installation surface (floor) can be reduced and the occupation area of the shelf 100 can be contained within the occupation area of the upper surface of the image forming apparatus 1.

FIGS. 8A, 8B, and 8C illustrate a third variation of the embodiment illustrated in FIG. 5. The shelf 100 includes the second shelf portion 120 and the right rear post 115R as in the embodiment illustrated in FIGS. 7A and 7B. The shelf 100 further includes the left rear post 115L to support the shelf portion 130, the second shelf portion 120, and the top plate 140. The second shelf portion 120 is disposed at a height at which the second shelf portion 120 does not interfere with the automatic document feeder 3 with the automatic document feeder 3 being open.

The image forming apparatus 1 includes a fixed top plate 5A fixed to the upper portion of the ejection unit 5 and a scanner 2, instead of the loading unit 6 illustrated in FIG. 2, between the automatic document feeder 3 and the jam processing unit 8.

The image forming apparatus 1 includes a support frame 500 that supports various structures such as the image forming device 7. The support frame 500 includes a left front post 551, a central front post 552, a tight front post 553, a left rear post 554 and a right rear post 555. The support frame 500 includes a left lower connecting member 501 connecting the left front post 551 and the left rear post 554; a left middle connecting member 504 and an upper left connecting member 509; a front lower connecting member 503 connecting the left front post 551 and the right front post 553; a left front connecting member 506 connecting the left front post 551 and the central front post 552; a right front connecting member 507 connecting the right front post 553 and the central front post 552; a lower right connecting member 502 connecting the right front post 553 and the right rear post 555; a right middle connection member 505 and an upper right connection member 510; and a rear upper connection member 508 connecting the left rear post 554 and the right rear post 555.

The front lower connecting member 503 is located below the bottoms of the sheet tray 9C and the electrical component housing 11 and above the upper end of the opening 10 and is connected to the lower end of the central front post 552. Such a configuration allows the opening 10 to be disposed below the space between the sheet tray 9C and the electrical component housing 11 while supporting the sheet tray 9C and the electrical component housing 11.

The lower end of the left front post 110L is supported by the upper end (support portion 2110L) of the left front post 551. The lower end of the right front post 110R is supported by the upper end (support portion 2110R) of the right front post 553. The lower end of the left rear post 115L is supported by the upper end (support portion 2115L) of the left rear post 554. The lower end of the right rear post 115R is supported by the upper end (support portion 2115R) of the right rear post 555.

The upper end of the left front post 551 is located near the lower end of the ejection unit 5. The upper end of the right front post 553 is located near the lower end of the scanner 2. The lower end of the scanner 2 is higher than the lower end of the ejection unit 5 (in other words, the height of the support portion 2110L is lower than the height of the support portion 2110R). Accordingly, the length of the left front post 551 is smaller than the length of the right front post 553. Since the sum of the length of the left front post 551 and the length of the left front post 1101, is equal to the sum of the length of the right front post 553 and the length of the right front post 110R, the length of the left front post 110L is greater than the length of the right front post 110R.

The upper end of the left front post 551 is located near the lower end of the ejection unit 5. The upper end of the left rear post 115L is located near the upper end of the fixed top plate 5A. The upper end of the fixed top plate 5A is higher than the lower end of the ejection unit 5 (in other words, the height of the support portion 2110L is lower than the height of the support portion 2115L). Accordingly, the length of the left front post 551 is smaller than the length of the left rear post 554. Since the sum of the length of the left front post 551 and the length of the left front post 110L is equal to the sum of the length of the left rear post 554 and the length of the left rear post 115L, the length of the left front post 110L is greater than the length of the left rear post 115L.

The upper end of the right front post 553 is located near the lower end of the scanner 2. The upper end of the right rear post 555 is located near the upper end of the fixed top plate 5A. The upper end of the fixed top plate 5A is higher than the lower end of the scanner 2 (in other words, the height of the support portion 2110R is smallest than the height of the support portion 2115R). Accordingly, the length of the right front post 553 is smaller than the length of the right rear post 555. Since the sum of the length of the right front post 553 and the length of the right front post 110R is equal to the sum of the length of the right rear post 555 and the length of the right rear post 115R, the length of the right front post 110R is greater than the length of the right rear post 115R.

The ejection unit 5, the scanner 2, and the fixed top plate 5A are disposed on the upper portion (upper surface) of the image forming apparatus 1. Since the ejection unit 5, the scanner 2, and the fixed top plate 5A have different heights, it is difficult to set all support portions of the left front post 110L, the right front post 110R, and the tight rear post 115R at the same height. Hence, according to the heights of the ejection unit 5, the scanner 2, and the fixed top plate 5A (that is, according to the heights of the support portions), the support portions have different lengths, thus allowing the plurality of posts of the shelf 100 to be easily attached to the upper and the upper surface of the image forming apparatus 1. With such a configuration, the occupation area on the installation surface (floor) can be reduced and the occupation area of the shelf 100 can be contained within the occupation area of the upper surface of the image forming apparatus 1.

The edge of the automatic document feeder 3 is located rearward of the edge of the image forming apparatus 1 in the front direction of the image forming apparatus 1. Such a configuration secures the work space for the user on the front side of the automatic document feeder 3 and the space in which the posts are arranged. Hence, the posts at the front side of the image forming apparatus 1 are configured to be longer than the plurality of posts disposed at the rear side of the image forming apparatus 1. Such a configuration allows the plurality of posts of the shelf 100 to be easily attached to the upper portion and the upper surface of the image forming apparatus 1.

The support frame 500 that includes the support posts such as the left front post 551 and supports various structures such as the image forming device 7 supports the plurality of posts such as the left front post 110L. Such a configuration allows the plurality of posts of the shelf 100 to be easily attached to the upper portion and the upper surface of the image forming apparatus 1 and the strength of the shelf 100 to be ensured.

Figure 9A:
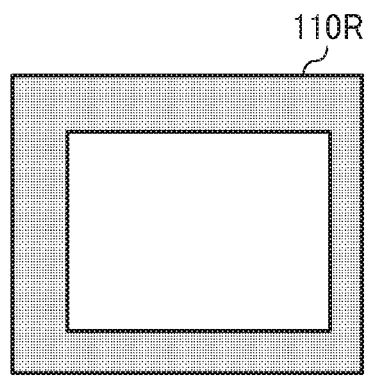
FIGS. 9A and 9B are cross-sectional views of a post illustrated in FIGS. 8B and 8C.
Figure 9B:
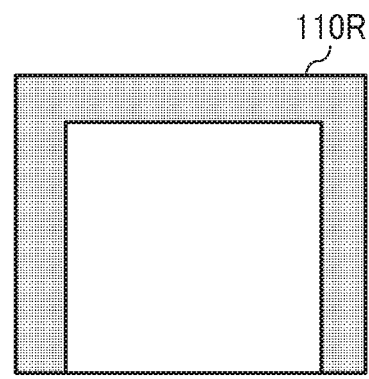

FIGS. 9A and 9B are cross-sectional views of the post 110R illustrated in FIGS. 8B and 8C in a horizontal plane. The post 110R may be formed in a rectangular shape having a hollow cross section as illustrated in FIG. 9A or may be formed in a U shape as illustrated in FIG. 9B.

Figure 10:
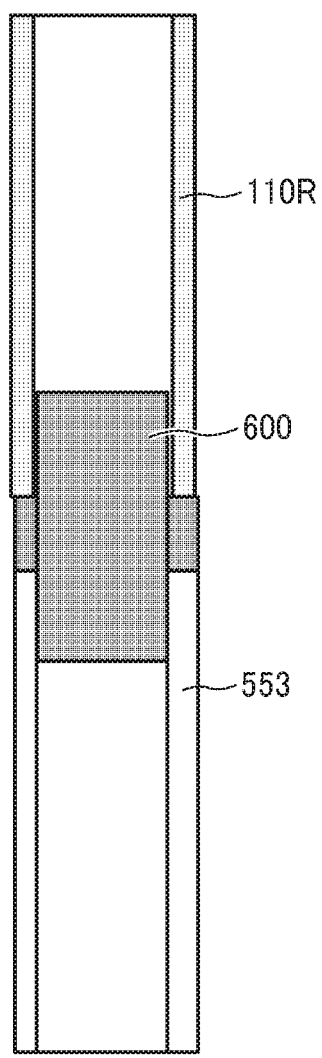
FIG. 10 is an illustration of a state in which the post illustrated in FIGS. 8A and 8B is supported.

FIG. 10 is an illustration of a state in which the post 110R illustrated in FIGS. 8B and 8C is supported. The image forming system 2000 includes a connector 600 having one end attached to the post 110R of the shelf 100 and the other end attached to the right front post 553 as an example of a support portion of the image forming apparatus 1. The connector 600 has an upper end attached to the lower end of the post 110R and a lower end to the upper end of the right front post 553. The plurality of posts of the shelf 100 can be easily attached to the upper portion and the upper surface of the image forming apparatus 1 and the strength of the shelf 100 can be ensured.

Figure 11:
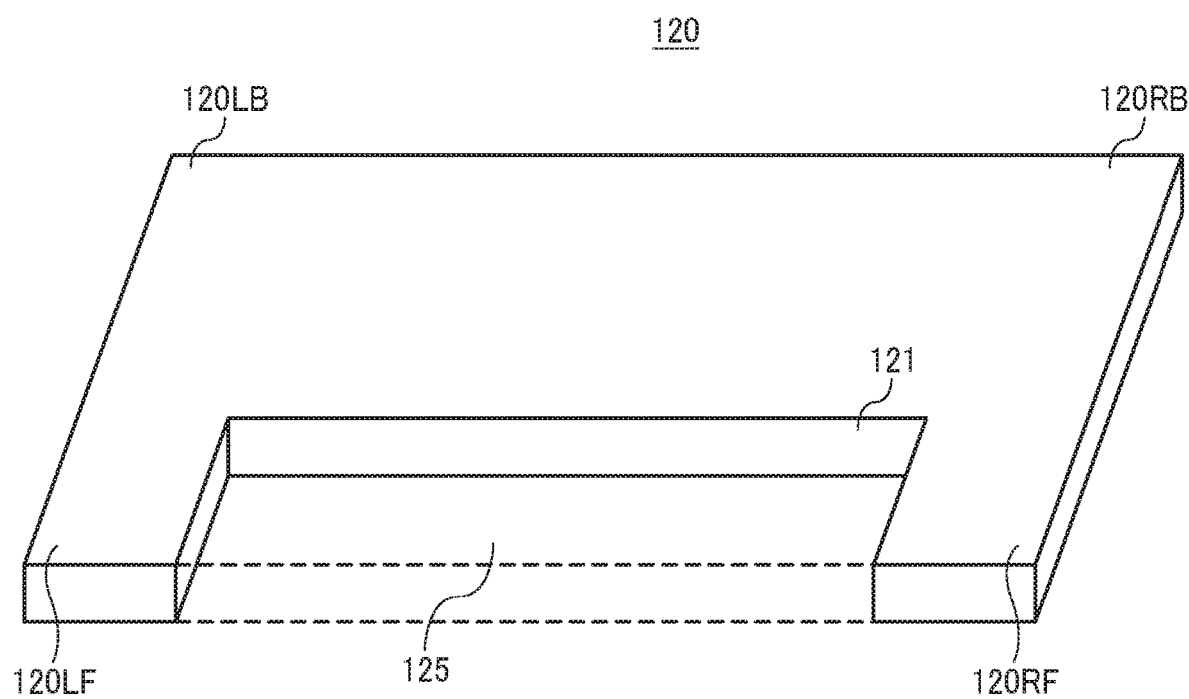
FIG. 11 is a perspective view of a variation of a second shelf portion illustrated in FIGS. 8A, 8B, and 8C.

FIG. 11 is a perspective view of a variation of the second shelf portion 120 illustrated in FIGS. 8A to 8C. The second shelf portion 120 includes a connecting portion 120LF to connect to the left front post 110L, a connecting portion 120RF to connect to the right front post 110R, a connecting portion 120LB to connect to the left rear post 115L, and a connecting portion 120RB to connect to the right rear post 115R. In the second shelf portion 120, a notch 125 cut out from the front of the image forming apparatus 1 is formed in a middle in the lateral direction of the image forming apparatus 1. The edge 121 of the notch 125 is disposed rearward of the connecting portion 120LF and the connecting portion 120RF in the front direction of the image forming apparatus 1.

That is, the edge 121 of the second shelf portion 120 is located rearward of the left front post 110L and the right front post 110R in the front direction of the image forming apparatus 1 and is also located rearward of the edge 1F of the image forming apparatus 1 illustrated in FIG. 7B. Thus, even in a case in which the shelf 100 is attached to the image forming apparatus 1, the work space of the user can be secured on the front side of the image forming apparatus 1.

Figure 12:
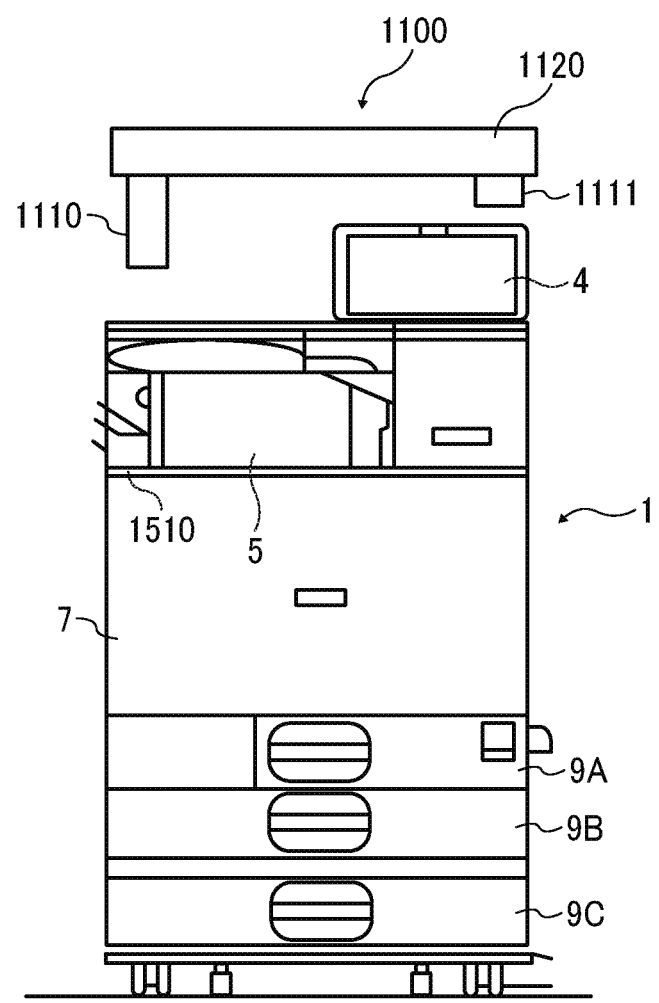
FIG. 12 is a front view of a fourth variation of the image forming system illustrated in FIG. 5.

FIG. 12 is a fourth variation of the embodiment illustrated in FIG. 5.

The image forming system 2000 includes the image forming apparatus 1 and a shelf 1100 supported on the upper portion and the upper surface of the image forming apparatus 1. FIG. 12 is a front view of the image forming apparatus 1 with the shelf 1100 removed.

The shelf 1100 includes a shelf portion 1120, and a cylindrical member 1110 and a prismatic member 1111 as examples of posts that support the shelf portion 1120. The image forming apparatus 1 includes a cylindrical-member support portion 1510 to support a cylindrical member 1110.

Figure 13:
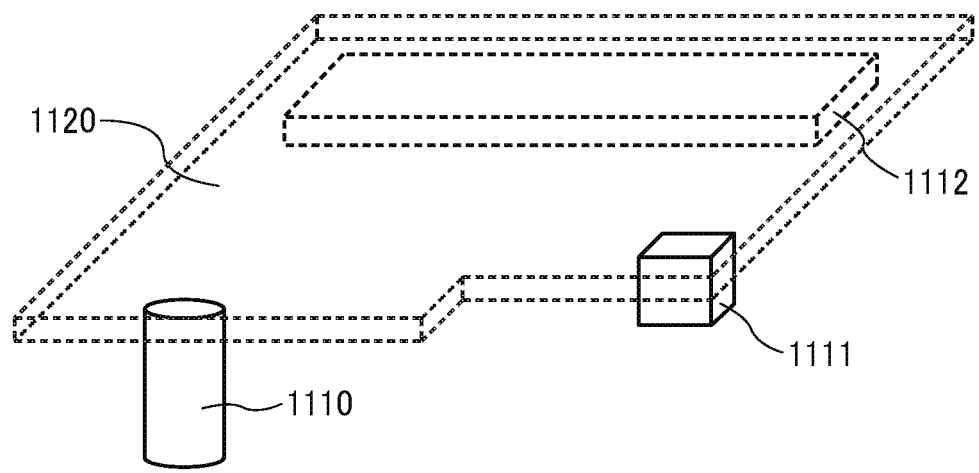
FIG. 13 is a perspective view of a shelf illustrated in FIG. 12.

FIG. 13 is a perspective view of the shelf 1100 illustrated in FIG. 12. The shelf 1100 further includes a plate member 1112 as an example of a post to support the shelf portion 1120.

The cylindrical member 1110 is arranged so that the cylindrical member 1110 is supported at the front side of the image forming apparatus 1. The plate member 1112 is arranged so that the plate member 1112 is supported at the rear side of the image forming apparatus 1. The prismatic member 1111 is disposed between the cylindrical member 1110 and the plate member 1112.

In the height direction, the cylindrical member 1110 is longer than the prismatic member 1111 and the prismatic member 1111 is longer than the plate member 1112.

Figure 14:
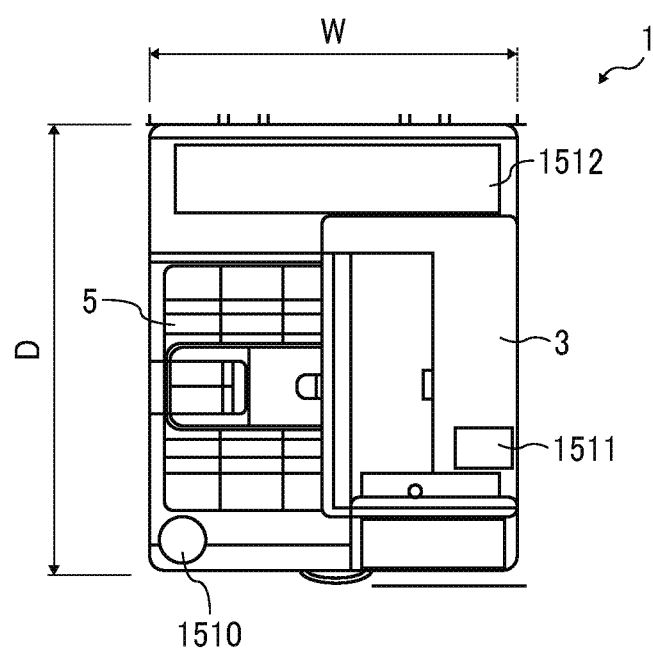
FIG. 14 is a top view of an image forming apparatus illustrated in FIG. 12.

FIG. 14 is a top view of the image forming apparatus 1 illustrated in FIG. 12. W indicates the dimension of the image forming apparatus 1 in the width direction of the image forming apparatus 1. D indicates the dimension of the image forming apparatus 1 in the depth direction of the image forming apparatus 1.

The image forming apparatus 1 includes a prismatic-member support portion 1511 to support the prismatic member 1111 and a plate-member support portion 1512 to support the plate member 1112.

The cylindrical-member support portion 1510, the prismatic-member support portion 1511, and the plate-member support portion 1512 are disposed on the upper portion (upper surface) of the image forming apparatus 1 in this order from the front side of the image forming apparatus 1. In addition, the relation is satisfied of the height of the cylindrical-member support portion 1510<the height of the prismatic-member support portion 1511<the height of the plate member support portion 1512. The sum of the length of the cylindrical member 1110 and the height of the cylindrical-member support portion 1510, the sum of the length of the prismatic member 1111 and the height of the prismatic-member support portion 1511, and the sum of the length of the plate member 1112 and the height of the plate-member support portion 1512 are all equal so that the shelf portion 1120 is horizontal. The above-described configuration allows the plurality of posts of the shelf 1100 to be easily attached to the upper portion and upper surface of the image forming apparatus 1. Accordingly, the occupation area on the installation surface (floor) can be reduced and the occupation area of the shelf 1100 can be contained within the occupation area of the upper surface of the image forming apparatus 1.

Figure 15A:
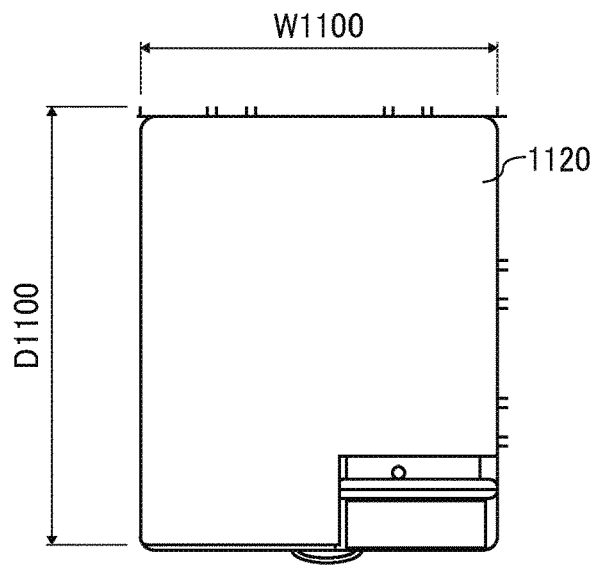
FIG. 15A is a top view of the image forming system illustrated in FIG. 12.
Figure 15B:
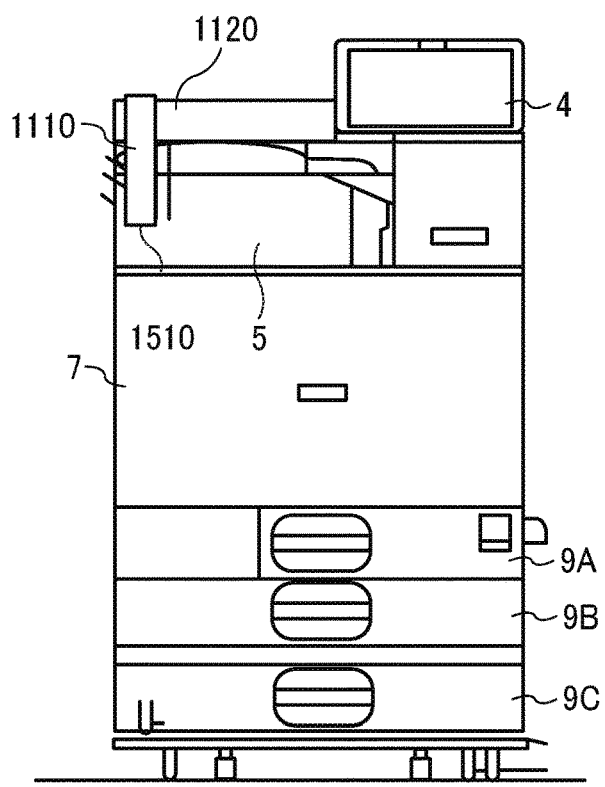
FIG. 15B is a front view of the image forming system illustrated in FIG. 12.

FIGS. 15A and 15B are a top view and a front view, respectively, of the image forming system 2000 illustrated in FIG. 12. FIGS. 15A and 15B illustrate the image forming apparatus 1 with the shelf 1100 attached.

W1100 indicates the dimension of the shelf 1100 in the width direction of the shelf 1100, D indicates the dimension of the shelf 1100 in the depth direction of the shelf 1100. The dimension W1100 of the shelf 1100 in the width direction is equal to or less than the dimension W of the image forming apparatus 1 illustrated in FIG. 14 in the width direction. The dimension D1100 of the shelf 1100 in the depth direction is equal to or less than the dimension D of the image forming apparatus 1 illustrated in FIG. 14 in the depth direction. That is, the occupation area of the shelf 1100 is contained within the occupation area of the upper surface of the image forming apparatus 1.

In the above-described embodiment, the image forming device 7 of a so-called full-color electrophotographic system illustrated in FIG. 4 has been described as an example of the image forming unit. Note that the system of the image forming unit is not limited to such a full-color electrophotographic system. For example, the image forming unit may be a monochrome electrophotographic image forming unit that forms an image using only black toner. Alternatively, the image forming apparatus may be an inkjet type image forming apparatus in which an inkjet head forms an image on a sheet conveyed from a sheet tray.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An image forming system, comprising:
a shelf having a notch therein;
an image forming apparatus configured to form an image and including a support portion on an upper surface of the image forming apparatus, the shelf being supported by the support portion; and
an operation panel on the upper surface of the image forming apparatus, wherein the operation panel is accessible via the notch in the shelf, wherein the shelf includes at least one post protruding toward the image forming apparatus.

2. The image forming system according to claim 1, wherein the at least one post includes a first post and a second post, and wherein the first post is longer than the second post.

3. The image forming system according to claim 2, wherein the first post is cylindrical, and
wherein the second post is a prismatic member.

4. The image forming system according to claim 2, wherein the shelf includes a plate member on a surface of the shelf facing the image forming apparatus.

5. The image forming system according to claim 4, wherein the first post is supported on a front side of the image forming apparatus,
the plate member is supported at a rear side of the image forming apparatus, and
the second post is disposed between the first post and the plate member.

6. The image forming system according to claim 1, wherein an edge of the shelf is disposed rearward of an edge of the image forming apparatus at a front side of the image forming apparatus.

7. The image forming system according to claim 1, wherein the shelf is detachably attachable to a body of the image forming apparatus.

8. The image forming system according to claim 1, wherein operation panel protrudes above the shelf.

* * * * *